Patented Feb. 12, 1952

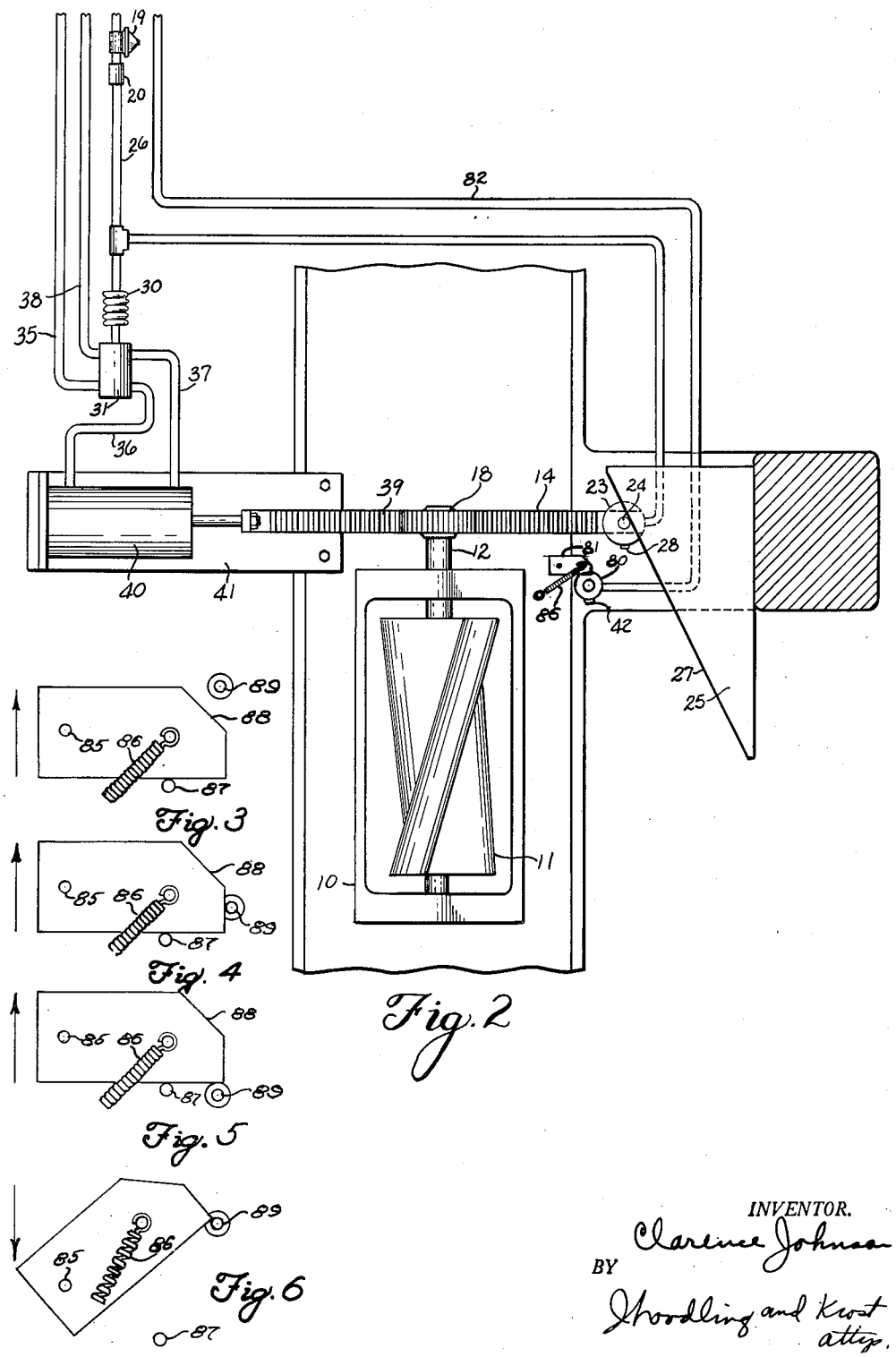

2,585,328

UNITED STATES PATENT OFFICE 2,585,328

MACHINE TOOL CONTROL

Clarence Johnson, Orfordville, Wis., assignor to Bailey Meter Company, a corporation of Delaware Application February 14, 1947, Serial No. 728,658

5 Claims. (Cl. 90—24.3)

My invention relates to machine tool controls in general, and more particularly to hydraulic pneumatic controls for a machine tool planer.

Planers, as is well known, operate basically upon the principle of moving a workpiece with a reciprocable motion relative to a tool. The tool remains stationary during the cutting stroke, and is moved laterally or vertically at the end of the stroke when the workpiece and tool are disengaged.

Planers of this type, prior to the development of the present invention, were normally controlled by manual operation of the tool relative to the workpiece, or operated by a series of mechanical movements. For many types of work this manual or mechanical control of the tool relative to the workpiece was entirely satisfactory, because accuracy within a few thousandths of an inch was tolerable. However, for work which requires an extremely close tolerance, these controls are entirely unsatisfactory. Nevertheless, nothing better was known and therefore much hand work was often required to grind and fit the workpieces after the machining was finished. One example of a typical workpiece requiring close tolerances, is a spiralling rotor for a rotary blower, such as used with large diesel engines. These rotors for the blower comprise three spiralling lobes on each rotor, and employ a right-hand and a left-hand rotor. These right-hand and left-hand rotors must fit together and roll together tightly in order that air will not leak past the lobes and reduce the efficiency of the blower. Accordingly, extremely close tolerances must be held to produce a workable blower machine. With mechanical methods of tool control in producing these rotors on a planer, applicant was faced with the distressing problem of spending many hours more time in grinding and fitting the rotors together after machining than was originally required for the machining operation.

Accordingly, an object of my invention is to provide a control system to accurately position the tool holder of a machine tool relative to a longitudinally reciprocating workpiece holder.

Another object of my invention is to provide position locking means for entrapping fluid in a pneumatic control hydraulic tool positioning system during work periods of a work cycle, and releasing the pneumatic control hydraulic system for movement corresponding to a pattern when the tool and workpiece are separated.

Another object of my invention is to provide pneumatic hydraulic tool holding and indexing systems for a machine tool having a workpiece holder and tool holder adapted to move relative to one another in a reciprocating cycle, the cycle including a work cutting period and an indexing interval.

Another object of my invention is the provision of a control system for the reciprocating cycle of a machine tool planer, including a master control to hold or hydraulically lock the tool in a fixed position for cutting the workpiece during the work cutting portion of the cycle, and an indexing control responsive to a pneumatic tracer device scanning a pattern to index or reposition the tool relative to the workpiece during the indexing interval at the end of the cutting period.

A further object of my invention is to provide an oscillatory rotating device for a machine tool planer work holder adapted for extreme accuracy of the oscillatory rotation throughout all portions of the rotating and reciprocating cycle.

Other objects and a fuller understanding of my invention may be had by referring to the following description and claims, taken in conjunction with the accompanying drawing, in which:

Figure 2 is a schematic illustration of an alternative oscillatory rotating mechanism; and Figures 3, 4, 5 and 6 are schematic illustrations of the master control template operation.

Figure 1:
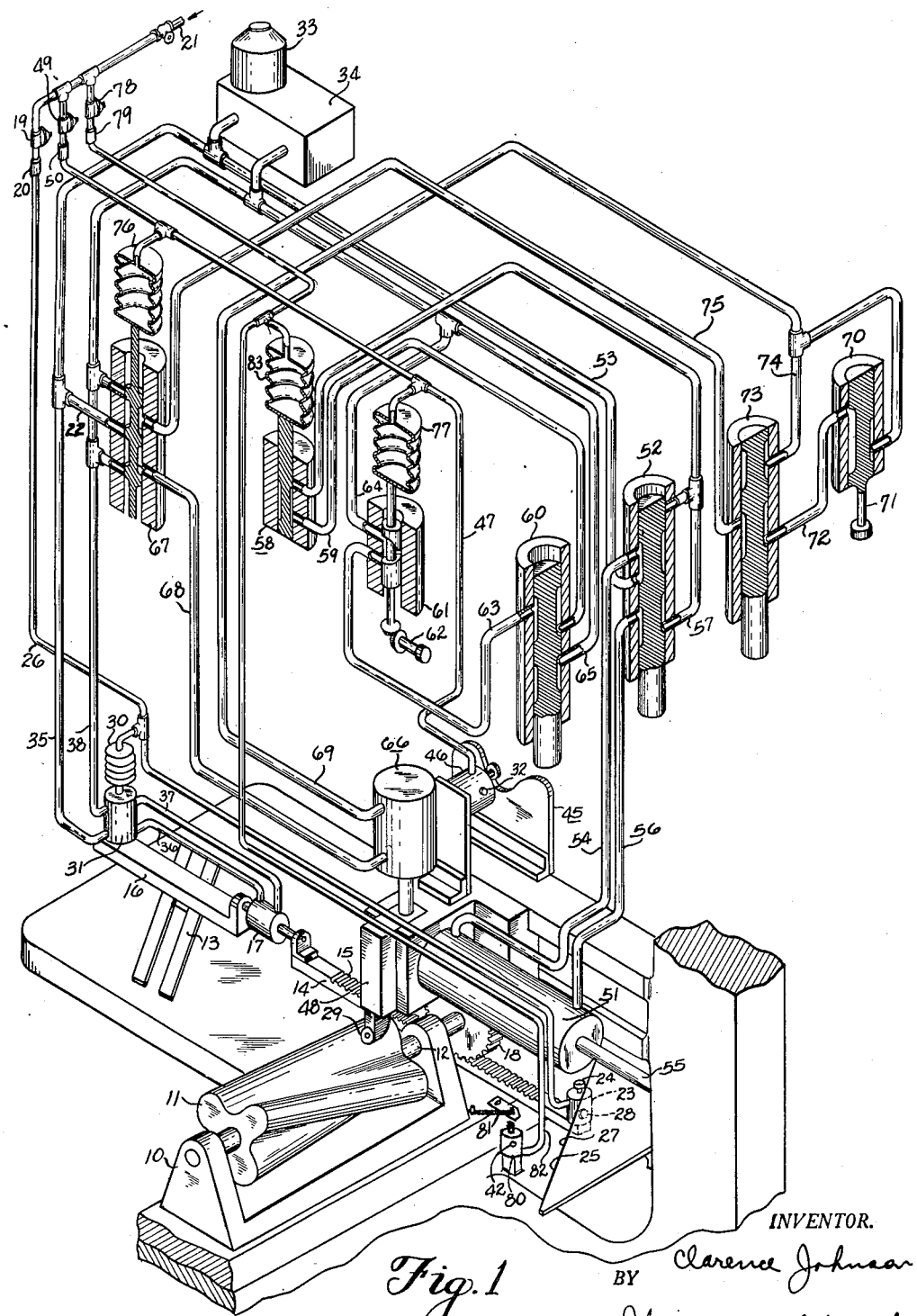
Figure 1 is a schematic illustration of my improved machine tool control, including a compensating oscillatory rotation control.

The illustrations of the interconnecting tubes and various members of my apparatus are schematic, but it is submitted that these illustrations will readily be understood. Although these various parts and interconnecting tubes could actually be employed as illustrated in the Figure 1, it is of course understood that the practical application would require convenient location of the automatic and manual controls relative to the machine. However, the interconnection between the various members, and their relative location will remain essentially as illustrated in the Figure 1. The necessary parts of the machine tool planer, for the purposes of this disclosure, are illustrated with the control system, and are essentially the arrangement as found on the open side type planer.

In the Figure 1, the reference character 10 indicates a reciprocable work carrying bed of a planer. A workpiece 11 is rotatably mounted by means of mounting pins 12 upon the reciprocable bed 10. I have chosen to illustrate my control system with a helically spiralled workpiece 11 because this workpiece was the first for which a full-size machine was fully equipped with my improved control system. It is understood, that this type workpiece is illustrated only for the purpose of explaining my improved control system, and is not intended to limit the control system for this particular workpiece.

Generally stated, my invention comprises a master control to hydraulically lock the tool of the planer in a fixed position for cutting the workpiece during the work cutting portion of the reciprocating cycle; an indexing control responsive to a pneumatic tracer device scanning a pattern to index or reposition the tool relative to the workpiece during the indexing interval at the end of the cutting period; and an oscillatory rotation mechanism for workpieces of the type to be oscillated about a longitudinal axis as well as reciprocated during the work cutting period.

In order to oscillatorily rotate the workpiece 11 upon the mounting pins 12, I have provided sine bar ways 13, a pinion gear 18 and a rack 14 extending to the ways 13. The pinion gear is drivingly mounted on pin 12. The rack 14, in the embodiment illustrated in the Figure 1, is divided into a toothed portion 15 and a bracket portion 16. Interconnecting between the toothed portion 15 and the bracket portion 16 of the rack 14, I have illustrated a small expansible contractible hydraulic chamber 17 and ram adapted to adjust the distances between the portions 15 and 16 of the rack 14, in order to compensate for mechanical misadjustment and wear in the rack and pinion 14 and 15, and the ways 13. The helical spiral is generated by means of the ways and the rack and pinion rotating the pin 12. The rotor lobe shape is generated by a combination of crank and positive motion cam. The sine bar ways 13 wear rapidly, and it is difficult to set the lead exactly from left to right. Also, there is some lost motion between the sides of the track in the ways 13 and the bracket 16 which reproduces the lost motion as irregularities directly on the work. Without the use of my improved expansible contractible chamber 17, the accuracy of the entire oscillatory rotation of the workpiece 11 would be dependent primarily upon the mechanical tolerances between the bracket portion 16 and the ways 13. Further, slight inaccuracies in the directional placement of the ways 13 would produce an irregular and undesirable oscillatory rotation of the workpiece 11. In order to correct the inaccuracies described, the expansible contractible chamber 17 is provided, and the expansion and contraction of the chamber is accurately controlled by the oscillatory rotation system.

The oscillatory system includes a tracer assembly 23 having a tracer arm 24 adapted to scan a pattern 25. Certain of my prior patents and applications have described a tracer mechanism which may preferably be employed in the present invention. In simplest language, the tracer which scans the pattern provides a valve or port bleeding a pressure fluid such as compressed air to the atmosphere from a substantially constant pressure source. The rate of bleed to atmosphere is determined by the freedom of the port under the dictate of the tracer and pattern. The preferred form of my oscillatory system employs a tracer discharging air under a pressure in the order of 35 p. s. i. freely to the atmosphere at a controllable rate. Air under pressure from any convenient source is conveyed to the tracer assembly 23 through pipe 21, a pressure regulator 19, and an orifice 20 to a pipe 26 connected with the tracer assembly 23. Air is discharged from the tracer assembly 23 through convenient outlets including the exhaust port 28.

As described in the application above referred to, movement of the tracer arm 24 will permit a variable amount of air to discharge from the tracer assembly 23. In the embodiment of the invention as illustrated in the Figure 1, the rack 14, which extends past the gear 18 is employed as a carriage for the tracer 23. Also, the pattern 25 is provided with an active contact edge 27. This edge 27, and the ways 13 should extend in exactly parallel relationship in a perfect assembly. Therefore, if the ways 13 are placed exactly right, and provided there would be no looseness of fit between the bracket 16 and the ways 13, the tracer assembly 23 should be carried along the edge 27 of the pattern 25 with such accuracy that the tracer arm 24 would remain stationary with respect to the bracer 23, and discharge a steady stream of air to atmosphere. Of course, such an ideal condition is practically unobtainable mechanically. Therefore, the tracer arm 24 will be activated to discharge a variable amount of air to atmosphere. As the air discharges from the tracer 23 to the atmosphere, the pressure in the pipe 26 between the orifice 20 and the tracer assembly 23 will vary, and such controlled air pressure is adapted to affect movement of a bellows 30 of a pilot valve assembly 31. I illustrate a fluid pump and motor assembly 33 with a supply of fluid in a sump 34. Fluid under pressure is supplied to the pilot valve 31 from the pump 33 through a supply line 35. The pilot valve 31 is sensitive to the slightest pressure changes in the bellows 30 to direct fluid to one end or the other of the chamber 17 through pipes 36 and 37. Drainage from the chamber 17 through the pilot valve 31 is returned to the sump 34 through a return header 38.

When the oscillatory rotation control is used for a blower rotor workpiece 11 as illustrated in the Figure 1, it is of course desirable that the tracer edge 27 be perfectly straight and accurately aligned. If the ways 13 are misaligned to some extent, the movement of the workpiece 11 will still be accurately controlled by my improved control system described, because the template 25 may be moved to position the contact edge 27 in such a position as to give perfect oscillatory rotation control. Further, if any curved or irregular surface should be desired on another type of workpiece, the contact edge 27 may be curved or otherwise formed to control the movement of the workpiece 11.

Figure 2 of the drawing illustrates a second embodiment of the portion of my invention adapted to control the oscillatory rotation of the workpiece 11. The Figure 2 is a schematic illustration showing the interrelation of the reciprocable bed 10 and the workpiece 11, with the workpiece 11 mounted on pins 12. The pinion gear 18 is mounted to drive pins 12, and a rack 39 is engaged with the pinion gear in a manner similar to the rack portion 15 illustrated in the Figure 1. An expansible contractible chamber 40 of the servo-motor type is mounted upon a bracket 41 to reciprocate with the bed 10. In this embodiment, the chamber 40 has a considerably longer stroke than the chamber 17 of Figure 1. Thus, instead of merely compensating for inaccuracies, the chamber 40 may be controlled by substantially the same control apparatus described in connection with the chamber 17 of Figure 1, and the entire movement provided by the chamber 40. Thus, as the bed 10 reciprocates and carries the tracer 23 along the tracer edge 27, the chamber 40 will reciprocate the rack 39 to provide the oscillatory rotating movement to the workpiece 11.

The drawings, as before stated, are schematic. Therefore, it is understood that wherever relative movement is required between units interconnected by tubes or pipes the tubes or pipes are of a flexible design capable of conducting fluids under pressure. These flexible tubes are commercially available today.

The indexing control and master control provides for relative movement of the tool holder relative to the workpiece holder and is illustrated schematically in the Figure 1 of the drawing. A tool holder 48 is moved relative to the planer and workpiece in a lateral direction by means of a servo-motor 51, and vertically by means of a servo-motor 66. Power means is provided for reciprocably driving the bed 10 to move the workpiece 11 longitudinally relative to the tool 29. Thus, the workpiece is carried in a complete work cycle including a work cutting portion of the cycle for cutting the workpiece, and an indexing interval in which the tool and workpiece are separated, and during which time I have provided for indexing or repositioning the tool for the next progressive work cutting period of the work cycle. Basically, the apparatus for producing the relative movement and work cycle control includes a pattern 45, a pneumatic system including a tracer 46 producing a varying pressure in a header pipe 47, a hydraulic power system responsive to the variations in pressure in the header 47 adapted to move the tool holder 48 during the indexing interval, and a master control system including a master control valve 58 for preventing the flow of fluid to the power system and thereby locking the power system against movement during the cutting period of the work cycle, and allowing the flow of fluid to the power system to index the tool during the indexing period of the work cycle.

The pattern or template 45 has a shape corresponding to the desired path of movement of the tool to produce the desired finished workpiece. By "corresponding" is meant that the pattern or template should preferably correspond to the desired workpiece, but is not necessarily identical in contour, and therefore the term "corresponds" implies that the pattern or template is purposely designed to result in the desired contour of the workpiece to be produced.

In the Figure 1, air under pressure from any convenient source is conducted to the header 47 through pipe 21. Although the pipe 21 is the same lead pipe feeding the pipe 26 and tracer 23, any suitable air source may be employed, and it is not intended that the various systems are dependent upon one another by the showing of only one air supply. The air from the pipe 21 is passed through a pressure regulator 49 and an orifice 50 to the header 47 and tracer 46. Air may be discharged from the tracer 46 through port 32. As the air discharges from the tracer 46 to the atmosphere the pressure in the header 47 between the orifice 50 and the tracer assembly 46 will vary, and such controlled air pressure is representative of changes in contour of the pattern 45.

Movement of the tool holder 48 in a lateral direction is produced by a servo-motor 51. This type of motor, as is well known, comprises a chamber with a piston therein and a rod extending out one end of the cylinder. Fluid under pressure from the pump 33 is conducted to a manually operable direction valve 52 through a pipe 53. During the indexing interval of the work operation, the tool holder progresses from right to left, transversely, in the Figure 1, and therefore the direction valve is positioned to conduct the hydraulic pressure from the pipe 53 to a lead pipe 54 going into the left-hand end of the motor 51. With fluid feeding into the left-hand end of the motor chamber, pressure will be exerted through the rod 55 against the side of the machine, and the tool holder will be moved toward the left. Fluid is introduced into the one side of the piston and exhausted from the other side to cause movement of the rod in one direction, and the flow reversed to cause movement of the rod in the opposite direction. Therefore, with the fluid entering the motor 51 through the pipe 54, exhaust fluid will be conducted out of the motor 51 through the pipe 56. This exhaust through the pipe 56 is conducted to the valve 52 and out through the pipe 57.

In my improved system, the fluid is conducted to the pipe 57 into a master control valve 58. The fluid then leaves the valve 58 through a pipe 59 and is conducted by the pipe 59 to a manually operated feed control valve 60. During the indexing interval of the work operation, the speed of the motor 51 should be relatively low, and I have provided a speed control or resistance valve 61 of improved design capable of adjustment by means of a hand adjustment 62 for preselecting the maximum operating speed of the motor 51. Further, the valve 61 is responsive to the variable pressure in the header 47 to further control the speed of the motor 51 in accordance with the template 45. During the indexing interval of the work operation, fluid is conducted through the pipe 63 from the valve 60 to the valve 61. From the valve 61, the fluid is then exhausted to the sump through a pipe 64. However, if rapid operation of the motor 51 is desired during the machine set up, or to move the tool out of contact with the work for some reason, the feed control valve 60 may be moved to conduct the fluid from the pipe 59 directly to the pipe 65 for direct return to the sump and by-pass of the valve 61, whereby rapid movement will be obtained.

A second servo-motor 66 is employed to move the tool holder 48 in a vertical direction relative to the workpiece 11. The motor 66 is of substantially the same type as the motor 51. Fluid under pressure is fed to the control system for the motor 66 through a supply pipe 22 leading from the pipe 35 and the pump 33. This fluid is directed by a pilot valve 67 to either the top or bottom of the motor 66, or may operate to stop off the flow of oil altogether and trap the oil on both sides of the motor piston in order to hold the motor and tool holder 48 stationary. Although the motor 66 moves both upwardly and downwardly under the dictate of the pattern 45, rather than predominantly in one direction of travel as indicated in connection with the motor 51, it will be apparent from the location of the tracer 46 relative to the template 45, that the direction of travel in the illustration will be upwardly. Accordingly, fluid is fed through the pilot valve 67 to the lead pipe 68 going into the bottom portion of the motor 66. Fluid is accordingly exhausted from the top part of the motor 66 through pipe 69. This exhaust fluid is conducted through the pipe 69 to a maximum speed valve 70. As indicated in the illustration, the maximum speed valve 70 may be hand adjusted by means of a control 71 to predetermine the maximum rate of flow of fluid therethrough and consequently the rate of movement of the motor 66. Fluid is then conducted from the valve 70 through pipe 72 to a manually operable by-pass valve 73. Also, a pipe 74 is provided to by-pass the valve 70 directly to the by-pass valve 73. Therefore, the operator may pre-select the position of the valve 73 to direct the exhaust fluid from the motor 66 through the maximum speed valve 70, or may direct the fluid through the by-pass line 74 for rapid operation. In either case, the fluid is conducted from the valve 73 through the pipe 75 and the pilot valve 67 to the sump 34.

As thus far described, therefore, my improved apparatus includes a pilot valve 67 controlling the direction of vertical movement of the tool holder 48 in response to a pattern 45 and tracer 46; a resistance valve 61 automatically slowing the speed of horizontal movement in accordance to the dictates of the pattern and tracer control, and at the same time being manually adjustable in the amount of automatic control; and four manual controls 52, 60, 70 and 73, for manually controlling the direction and speed of operation.

The third portion of my improved control system comprises a master control system for hydraulically locking the motors 51 and 66 against movement during the cutting period, and releasing the motors to the control of the pattern and tracer during the indexing interval. This control system includes a convenient source of air pressure, again the source conducted through the pipe 21, a pressure regulator 78, and an orifice 79. A tracer 80, similar in construction to the tracers 23 and 46, and exhausting air to atmosphere through port 42, is conveniently mounted on a stationary portion of the machine tool.

An actuating member 81, as illustrated in Figures 3, 4, 5 and 6 of the drawings, is reciprocably carried by the reciprocating bed 10. Although the tracer 80 and the actuating member 81 are illustrated beside the reciprocating bed 10, any convenient location may be employed.

The member 81, I have found, is preferably formed to actuate the tracer 80 for an interval of time in order that the master control valve 58 will be moved to a release position, whereby fluid may momentarily flow through the valve 58 to the motor 51 to permit the motors 51 and 66 to operate as previously described. The interval of time, on a planer, I have found, need be in the order of a small fraction of a second.

In the Figure 3, the actuating member 81 is pivotally mounted by means of pin 85. A spring 86 is provided to urge the member 81 to a rest position against a stop member 87, as illustrated.

As the member 81 moves with the bed 10, a cam edge 88 of the member 81 contacts the feeler arm 89 of the tracer 80 and actuates the arm 89 momentarily out of its rest position, and disturbs the air flow from the tracer 80. It is during this short period of disturbance that the indexing of the tool holder 48 takes place.

The member 81 is so located with reference to the tracer 80, that the member 81 will actuate, the feeler arm 89 as soon as the tool 29 is separated from the workpiece 11 at the beginning of the indexing cycle. Thereafter, the member 81 will pass beyond the arm 89 as the bed 10 moves to the end of its reciprocating cycle. See Figure 5. During this interval, the entire indexing and master control system has time to "settle down" before the tool 29 again engages the workpiece 11.

In the Figure 6, which illustrates the return stroke of the bed 10 and member 81, the member 81 is shown pivoted by contact with the feeler 89. The feeler 89 is movable in only one direction, and therefore the air pressure in the pipe 82 is not disturbed by such contact in pivoting the member 81. After the member 81 has moved beyond contact with the feeler arm 89, the spring 86 is adapted to pivot the member 81 back into the position illustrated in Figure 3 against the pin 85.

Thus, the tracer 80 discharges a fixed amount of air to atmosphere at all times except for the brief moment when it is actuated by the member 81. A pipe 82 conducts air from the orifice 79 to the tracer 80 and serves as a header pipe. Therefore, there is a given amount of pressure in the pipe 82 until the tracer 80 is actuated by the member 81, and then the air pressure will be momentarily disturbed in the pipe 82. A bellows 83 is adapted to respond to that disturbance in pressure and move the master control valve 58. As illustrated in the Figure 1, the member 81 is out of contact with the tracer 80, and therefore the normal undisturbed pressure is prevailing in the pipe 82. Under this set of circumstances, it is desired that the tool holder 48 be locked in its position, because it is in contact with the workpiece 11. Therefore, the inner portion of the valve 58 is in a fluid blocking position as illustrated in order to block off the passage of fluid from the motor 51 through the pipes 56, 57, 59, 63 and 64. Therefore, the motor 51 is stopped, and lateral movement of the tool holder 48 and the tracer 46 is arrested. Because the tracer movement has been arrested, discharge of air to atmosphere through the header 47 will be at a constant rate, and the pilot valve 67 will be positioned as illustrated to block off the passage of fluid to or from either side of the motor 66, and consequently the motor 66 will also be locked in its position.

In operation, when the pump 33 delivers fluid under pressure, the tendency will be for the motor 51 to move the tool holder 48 at a predetermined rate to the left in the illustration. As this movement normally progresses, the tracer 46 is carried therealong and scans the template 45. Hydraulic motor controls operate in response to the tracer relationship to the template 45 in order to position the tool holder 48 relative to the workpiece 11. However, in planer operation wherein the workpiece reciprocates relative to the tool in the tool holder 48, the tool may be indexed only during the indexing period of the work cycle. In machine tool practice, the reciprocation of the bed 10 is so fast that the tool is out of contact with the workpiece for only a brief interval in the order of a fraction of a second during the indexing interval. It is during this interval that the member 81 actuates the tracer 80 and upsets the air balance in the pipe 82. However, the bellows 83 is able to move the valve 58 and allow fluid to pass therethrough for a long enough period of time for the motor 51 to move the tool holder laterally, and for the tracer 46 to respond to the shape of the pattern 45 and cause vertical movement of the motor 66. Therefore, my invention supplies an improved indexing mechanism for the movement of the tool, and provides master control to lock the tool against indexing movement during the cutting period of a work cycle by permitting the indexing mechanism to completely control the tool during the indexing interval. My invention also supplies an accurate oscillatory rotation movement of the reciprocating workpiece during the work cycle.

When machining the particular workpiece 11 illustrated, the entire profile may be made completely around the workpiece by forming the pattern 45 to correspond to 120° of the 360° circumference in the workpiece. The workpiece is then repositioned three times for one complete machining operation. Therefore, by forming the pattern 45 to correspond to 120° of the circumference, the workpiece 11 may be repositioned after the tracer 46 has traversed the pattern 45. It is apparent therefore, that my control system embraces a new type tracer pattern method wherein the machine tool is indexed relative to the workpiece through a sequence of movements which will be repeated a plurality of times in order to produce a complete profile on the finished workpiece. By this provision, the complexity of the indexing mechanism is greatly reduced, and the efficiency of the machine tool increased.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a machine tool having a tool holder and a reciprocating workpiece holder moving in a work cycle including a cutting period and indexing interval, the provision of apparatus for relatively moving the tool holder and workpiece holder, comprising indexing means including a pattern, a first substantially constant air supply, tracer means exhausting air to atmosphere from said first air supply at a variable rate in response to the form of said pattern, said variable rate of exhaust producing a variable pressure between said air supply and said exhaust means, first pressure responsive means responsive to said variable pressure, a first hydraulic system including a piston for moving the tool holder in a first direction, a second hydraulic system including a piston for moving the tool holder in a second direction, said first and second hydraulic systems being controlled by said first pressure responsive means, and master control means, said master control means including hydraulic entrapment valve means having a first position for entrapping fluid in said first and second power systems to lock said power systems against movement, and having a second position releasing said first and second power systems to the control of said first pressure responsive means, a second substantially constant air supply for said master control, trip means exhausting air to atmosphere from said second air supply at a first rate during the cutting period of the work cycle, trip actuating means responsive to the reciprocating movement of the work holder adapted to actuate said trip means during the indexing interval of the work cycle and cause said trip to exhaust air at a second rate from said second air supply, second pressure responsive means between said second air supply source and the trip means, said second pressure responsive means being responsive to the first rate of discharge to operate said hydraulic entrapment valve to said first position and lock said first and second power systems against movement, and responsive to said second rate of discharge to operate said hydraulic entrapment valve to release the first and second power systems to the control of the pneumatic tracer system.

2. In a machine tool having a tool holder and a reciprocating workpiece holder moving in a work cycle including a work period and indexing interval, the provision of apparatus for relatively moving the tool holder and workpiece holder, comprising indexing means including a pattern, a pneumatic tracer system including a first substantially constant air supply, tracer means exhausting air to atmosphere from said first air supply at a variable rate in response to the form of said pattern, said variable rate of exhaust producing a variable pressure between said air supply and said exhaust means, first means responsive to said variable pressure, a first power system for moving the tool holder in a first direction, a second power system for moving the tool holder in a second direction, said first and second power systems being controlled by said first pressure responsive means, said first and second directions being in one plane, said workpiece holder being adapted to move with a reciprocating motion in a direction substantially at right angles to said plane, and master control means, said master control means including position locking means for said first and second power systems, a second substantially constant air supply for said master control, trip means exhausting air to atmosphere from said second air supply at a first rate during the work period of the work cycle, trip actuating means responsive to the reciprocating movement of the work holder adapted to actuate said trip means during the indexing interval and cause said trip to exhaust air at a second rate from said second air supply, second pressure responsive means between said second air supply source and the trip means, said second pressure responsive means being responsive to the first rate of discharge from said trip means to operate said position locking means to a locking position and lock said first and second power systems against movement, and responsive to said second rate of discharge to operate said position locking means to a release position and release the first and second power systems to the control of the pneumatic tracer system.

3. In a machine tool planer having a rotatable reciprocating work holder movable in a work cycle including a work cutting period and an indexing interval, and a tool holder movable through an angular path relative to said work holder, an indexing means including first pattern controlled pneumatic indexing means, and first hydraulic motive means for positioning the tool holder along said angular path relative to the workpiece holder, a master control means including hydraulic entrapment means having a locking position adapted to entrap hydraulic fluid in said first hydraulic motive means and lock the first hydraulic motive means against movement, and having a release position adapted to place the first hydraulic motive means under the control of said first pattern controlled pneumatic pressure means, trip means, interconnecting means between said trip means and said hydraulic entrapment means, means responsive to a relative position of the work holder and tool holder during the cutting period to actuate said trip means to a first position and actuate said interconnecting means to move said entrapment means to said locking position, and responsive to the indexing interval position of the work holder and tool holder to actuate said interconnecting means to move said entrapment means to said release position, and work holder rotating means, said rotating means including rack and pinion means, way means, bracket means adapted to slidably engage said way means, hydraulic expansible contractible means interconnecting said bracket and rack, and second pattern controlled pneumatic pressure means, said expansible contractible means being under the control of said second pattern controlled pneumatic pressure means to adjust the position of the rack relative to said way means.

4. An oscillatory rotating control for a machine tool work holder, comprising rotatable mounting means for a workpiece, rack and pinion means to oscillatorily rotatably drive said work holder, expansible contractible hydraulic means drivingly attached to said rack, footing bracket means to position said expansible contractible means relative to said pinion, a pneumatic tracer system for controlling said expansible contractible means, including a substantially constant air supply, tracer means, pattern means, means to move the tracer responsively to the rack movement and relative to the pattern, said tracer exhausting air to atmosphere from said air supply at a variable rate in response to the form of said pattern, said variable rate of exhaust producing a variable pressure between said air supply and said tracer, pressure responsive means responsive to said variable pressure, pilot valve means directing fluid to said expansible contractible means, said pilot valve being controlled by said pressure responsive means.

5. An oscillatory rotating control for a machine tool work holder, comprising a longitudinally reciprocable and rotatable mounting means for a workpiece, rack and pinion means reciprocably carried with said mounting means to oscillatorily rotatably drive said work holder, way means extending at an angle to the path of said longitudinal movement of the work mounting means, bracket means slidably attached to said way means, expansible contractible hydraulic means interconnecting said rack and bracket, a pneumatic tracer system for controlling said expansible contractible means including a substantially constant air supply, tracer means, pattern means, means to move the tracer responsive to the rack movement and relative to the pattern, said tracer exhausting air to atmosphere from said air supply at a variable rate in response to the relative position of the tracer and pattern, said variable rate of exhaust producing a variable pressure between said air supply and said tracer, pressure responsive means responsive to said variable pressure, pilot valve means directing fluid to said expansible contractible means, said pilot valve means being controlled by said pressure responsive means.

CLARENCE JOHNSON.

REFERENCES CITED

The following references are of record in the file of this patent:

UNITED STATES PATENTS

| Number | Name | Date |
| --- | --- | --- |
| 2,101,712 | Johansen | Dec. 7, 1937 |
| 2,154,718 | Bannon | Apr. 18, 1939 |
| 2,402,450 | Salisbury | June 18, 1946 |
| 2,420,547 | Lovely | May 13, 1947 |
| 2,436,373 | Barnes | Feb. 24, 1948 |
| 2,485,716 | Eberlein | Oct. 25, 1949 |